United States Patent [19]
Abramov et al.

[11] Patent Number: 5,643,457
[45] Date of Patent: Jul. 1, 1997

[54] METHOD FOR WATER RECOVERY FROM ATMOSPHERE OF HABITABLE PRESSURIZED MODULE

[75] Inventors: Grigory Khananovich Abramov; Mikhail Sergeevich Amiragov; Valery Borisovich Astafiev, all of Moscow; Sergei Valentinovich Berezkin, Moskovskaya oblast; Leonid Sergeevich Bobe, Moscow; Viktor Pavlovich Bykov, Moscow; Jury Borisovich Vasiliev, Moscow; Vladimir Mikhailovich Gordeev, Moscow; Eleonora Sergeevna Djukova, Moscow; Vladimir Mikhailovich Novikov, Moscow; Alexandr Yakovlevich Podrugin, Moscow; Nikolai Nikolaevich Protasov, Moscow; Margarita Dmitrievna Razgulina, Moscow; Nikolai Mikhailovich Samsonov, Moscow; Galina Sergeevna Sinyak, Moscow; Jury Emelyanovich Sinyak, Moscow; Nikolai Sergeevich Farafonov, Moscow, all of Russian Federation

[73] Assignee: Aktsionernoe Obschestvo Otkrytogo Tipa, Russian Federation

[21] Appl. No.: 369,711

[22] Filed: Jan. 6, 1995

[51] Int. Cl.$^6$ .................................................. C02F 9/00
[52] U.S. Cl. ........................... 210/668; 210/669; 210/694; 210/748
[58] Field of Search ................................. 210/668, 669, 210/694, 747, 763, 764, 251, 748; 244/159

[56] References Cited

U.S. PATENT DOCUMENTS 3,242,058  3/1966  Ganley et al. ........................ 210/251
4,029,578  6/1977  Turk ..................................... 210/763
5,005,787  4/1991  Cullingford ........................... 244/159
5,234,584  8/1993  Birbara et al. ........................ 210/763
5,387,278  2/1995  Mangialardi .......................... 244/159

OTHER PUBLICATIONS

V.N. Serebry Akov "Fundamentals of Designing Life–Support Systems for Spacecraft Crews" Moscow, Mashinostroyeniye 1983.

A.S. Eliseyev "Techniques of Space Flights" Moscow, Mashinostroyeniye 1983.

Thomas P. Filburn, et al., "Continuous Flow, Water Post–Treatment System for Human Spacecraft Application", 25th International Conference on Environmental Systems, San Diego, California, Jul. 10–13, 1995 (pp. 1–6).

Primary Examiner—Ivars Cintins
Attorney, Agent, or Firm—Ostrolenk, Faber, Gerb & Soffen, LLP

[57] ABSTRACT

A method for water recovery from the atmosphere of a habitable pressurized module laden with water vapors released by the inhabitants of said pressurized module, comprising the steps of condensing vapor to produce a gas-liquid mixture, filtering said mixture, carrying out catalytic oxidation of undissociating organic compounds contained in the gas-liquid mixture into dissociating ones by means of a metal-carbon catalyst containing at least one metal of the platinum group, separating condensate from said mixture, sorption-purification of condensate by passing it through activated carbon and ionites followed by disinfection, mineralization and preservation of purified condensate. The system for realization of said method comprises a successively arranged means for condensation of water vapors, a filter, a catalytic oxidation reaction vessel, a condensate separation unit, a sorption purification unit and a water conditioning unit.

7 Claims, 3 Drawing Sheets

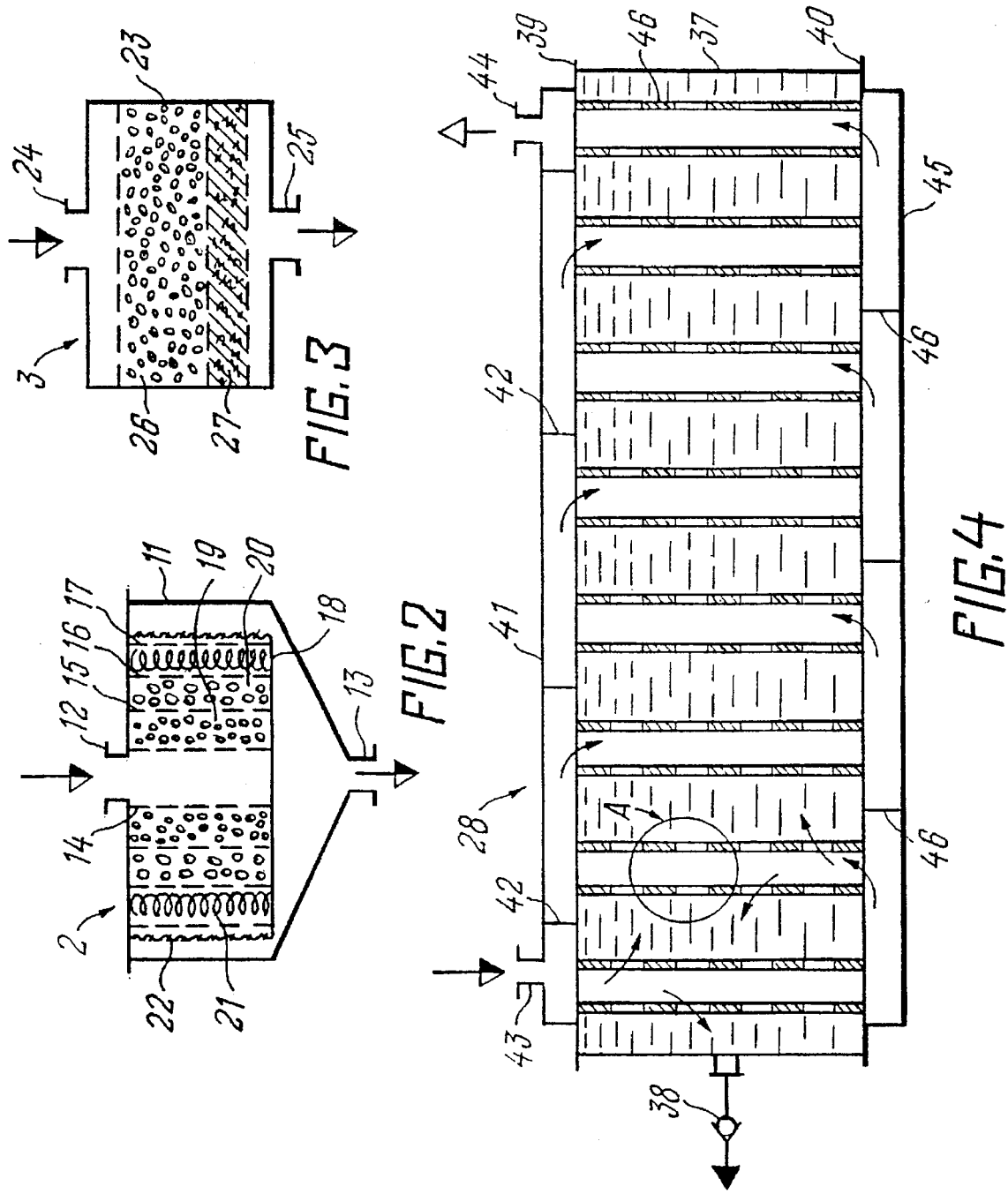

METHOD FOR WATER RECOVERY FROM ATMOSPHERE OF HABITABLE PRESSURIZED MODULE

FIELD OF ART

The present invention relates to life-support systems of inhabitants of pressurized modules, such as crews of spacecraft, orbital stations, particularly to the methods and systems of water supply relying on regenerative processes, and more specifically, it relates to a method and system for production of water from the atmosphere of a module.

BACKGROUND OF THE INVENTION

On long-duration flights, the most rational method of producing water is its regeneration from metabolic by-products of astronauts. Water is regenerated, for example, from moisture released by astronauts into the atmosphere of modules of an orbital station (or space-craft) with exhaled air and as perspiration, through the skin. Moisture is collected from the atmosphere by condensing its vapors in special apparatuses of the thermal control system of an orbital station from where the collected humidity condensate leaves together with transport air in the form of a gas-liquid mixture. The condensate contains particulates and dissolved dissociating and undissociating organic and inorganic compounds. The majority of these contaminants are toxic so that, in spite of their comparatively small concentration in condensate, production of potable water from condensate requires the removal of the contaminants.

Sorption is known in the prior art as the method of the removal of contaminants from humidity condensate by passing the condensate through a bed of activated carbon (to remove the undissociating contaminants) and a bed of ionites (an ion exchange meterial) (to remove the dissociating contaminants) which is followed by condensate disinfection mineralization and preservation. The known method of sorption was used in a system for water recovery from humidity condensate, said system comprising a gas-liquid mixture separator, based on porous hydrophylic barriers a column with ionite and activated carbon, a water conditioning column containing salt-saturating bed materials from gypsum ($CaSO_4$), dolomite $CaMg(CO_3)_2$, fluorite ($CaF_2$), etc., a column with an adsorbent saturated with silver salts known for a bactericidal effect (V. N. Serebryakov "Fundamentals of Designing Life-Support Systems for Spacecraft Crews". Moscow. Mashinostroyeniye. 1983, pp. 93–94).

The known method is noted for a short service life of the separator in terms of produced condensate due to clogging of pores in hydrophylic barriers with particulates and fouling of pores with microflors, the necessity for selecting the sorption bed materials (proportions of cationite, anionite and activated carbon) for each particular condensate depending on its contents of dissociating and undissociating organic contaminants, and the irregularity of mineralization and saturation of water with silver ions.

In addition, there is a method for producion of water from the atmosphere of a habitable pressurized module containing water vapors released by the inhabitants of said module, said method involving condensing said vapors into a gas-liquid mixture, filtering said mixture, separating condensate therefrom, sorption purification of condensate by passing it through activated carbon and ionites with subsequent disinfection, mineralization and preservation of the purified condensate; also known is a system realizing said method which functioned on the orbital station "Salyut-6" (A. S. Eliseyev."Techniques of Space Flights". Mashinostroyeniye. Moscow, 1983, pp. 142–145).

The system for the implementation of the known method comprises means connected in series for condensing water vapors and producing a gas-liquid mixture, a filter for said mixture, a condensate-separating unit, a unit for sorption cleaning of condensate comprising in succession chambers with activated carbon and ionite, a water conditioning unit comprising a chamber filled with sterilizer and another chamber filled with mineralizer, a contaminant carry-over sensor, and tanks for potable and service water.

The system functions as follows. A gas-liquid mixture (humidity condensate with transport air) is fed from the thermal control system of the station to the filter designed to remove particulates and partially chemical contaminants from said mixture. The chemical contaminants are removed by activated carbon while the particulates are separated by polypropylene fiber and filtering cloth.

The gas-liquid mixture then enters the separation unit where condensate its separated from transport air and fed by a pump into a purification unit containing sorption bed materials on the basis of activated carbon and ion-exchange resins, while air is returned into the service module. Condensate is separated in the separator of the separating unit comprised of a stack of capillary-porous hydrophylic tubes (porous barrier and a bladder tank outfitted with a movable piston with the intertubular space of the stack and the tank in the initial condition filled with water).

In case of potable grade quality determined with the aid of the contaminant carry-over sensor, the water from the purification unit is fed to the conditioning unit while the off-spec. water is dumped into the tank for service water. The water in the conditioning unit is saturated with mineral salts by a contact method and preserved with silver ions before entering the potable water tank.

The above-described system for water recovery from humidity condensate proved to be highly efficient on long-duration flights of the orbital station "Salyut-6" and incorporation of the filter for the gas-liquid mixture into the system made it possible to extend the service life of the separation and purification units as compared with the known system described above. However, both the recovery method used in this system and the system proper have still suffered the following disadvantages:

a short service life of the purification unit in terms of organic contaminants and its dependence on the ratio of dissociating and undissociating contaminants in the condensate;

loss of permeability of the walls of the hydrophilic capillary-porous tubes in the separation unit due to fouling of pores with microflora in case of long-time intervals (a month and longer) between the filling of the unit with water during its preflight preparation and start-up and, as a consequence, reduction of its service life in terms of liquid separation;

a necessity for replacing the entire separation unit after its capillary-porous tubes reach the end of their service;

a lack of information on the end of service life of the separator incorporated in the separation unit;

irregularity of injection of salts and ions of silver into the product water, as the conditioning unit reaches the end of its life;

a relatively high specific weight of the system.

OBJECTS OF THE INVENTION

The main object of the invention resides in increasing the efficiency of condensate purification irrespective of the ratio of dissociating and undissociating impurities contained therein.

The second object of the invention resides in extending the service life of the sorbtion purification unit and, subsequently, of the system as a whole.

The third object of the invention resides in extending the service life of the condensate separation unit.

The fourth object is ensuring the high quality of the water processed.

The fifth object is reducing the specific weight of the system.

These and other objects are accomplished by providing a method for water recovery from the atmosphere of a habitable pressurized module, said atmosphere containing water vapors released by the inhabitants, by condensing the vapor to produce a gas-liquid mixture, filtering said mixture, separating condensate therefrom, sorbtion purification of condensate by passing it through activated carbon and ionites with subsequent disinfection mineralization and preservation of the purified condensate wherein, according to the invention, separation of condensate is preceded by catalytic oxidation of undissociating organic contaminants in the gas-liquid mixture and transforming them into the dissociating ones by using a metal-carbon catalyst containing at least one metal of the platinum group.

It is expedient that the condensate be disinfected and conserved in the process of catalytic oxidation by applying the action of silver ions to said condensate and by the electrical field of the electrochemical silver-platinum pair.

It is advantageous that the oxidant in catalytic oxidation be constituted by the oxygen contained in the air of the gas-liquid mixture.

To promote oxidation of undissociating contaminants and to increase the degree of transformation of undissociating impurities into the dissociating ones, it is desirable that the process of separation should include an additional catalytic oxidation of the undissociating organic contaminants contained in the condensate, using a metal of the platinum group as a catalyst.

In order to extend the service life of the separator and prevent its fouling with microflora, it is feasible that the condensate be disinfected electrochemically in the course of separation by subjecting it to the effect of an electric field generated by an electrochemical platinum-silver pair.

With the same purpose in view, condensate can be additionally acted upon silver ions.

In order to improve the quality of water, it is desirable that it be preserved by passing the contaminant free condensate through a bed of metal-carbon catalyst containing at least one metal of the platinum group, a bed of ionite and a bed of silver impregnated activated carbon.

The above objects are also attained by providing a system for water recovery from the atmosphere of a habitable pressured module containing water vapors released by the inhabitants, said system comprising successively-connected means for condensation of water vapors and producing a gas-liquid mixture, a filter for the gas-liquid mixture, a condensate separating unit, a condensate sorption purification unit comprising a chamber with activated carbon and a successively-positioned chamber filled with ionite, a water conditioning unit comprising a chamber filled with sterilizer and a chamber filled with mineralizer wherein, according to the invention, the filter of gas-liquid mixture is followed by a reaction vessel for catalytic oxidation of undissociating organic contaminants, said vessel containing a metal-carbon catalyst as a filler which contains at least one metal of the platinum group.

In order to raise the degree of decontamination and preservation of condensate, the filler can be additionally provided with silver impregnated carbon.

To provide for the required degree of the removal of particulates from the gas-liquid mixture and for decontamination of condensate and oxidation of the undissociating organic impurities in the condensate, it is practicable that the filter of gas-liquid mixture should be outfitted with a cylindrical casing with a central perforated pipe communicating with the filter inlet, and perforated cylinders arranged concentrically with said pipe and forming three annular chambers filled with filtering packing, the casing and perforated cylinder should preferably be made from a conducting silver-clad material and the packing in the annular chamber located first from the axis should be made of silver impregnated activated carbon while in the second chamber, it should be made from a metal-carbon catalyst containing a metal of the platinum group, and in the third group, it should consist of granulated or fibrous ionite.

To provide the crew with prompt information when the separation unit reaches the end of its service life, it is desirable that the condensate separation unit should contain a separation section divided by a capillary-porous barrier from a hydrophilic material into two cavities, one having a fitting for feeding a gas-liquid mixture communicating with the reaction vessel outlet, and a fitting for venting the gaseous phase, the other cavity being filled with a liquid and has an opening of the outlet for communication with a condensate removal unit, the separation section is incorporated with a service end of life sensor made in the form of a chamber divided by a capillary-porous barrier of a hydrophobic material into two cavities, one communicating with the gaseous phase outlet of the separation section and with the pressure differential gauge while the other one, with the atmosphere of the pressurized module.

To ensure additional catalytic oxidation of condensate undissociating organic contaminants and to disinfect it in the course of separation, it is desirable that the surfaces and walls of pores of the capillary-porous barrier in the separation section should be coated partly with metallic platinum and partly with metallic silver.

To ensure the required service life of the separation section by preventing the fouling of pores of the capillary-porous barrier with microflora, it is preferable that the liquid chamber of the separation section should be filled with an aqueous solution of ionic silver with silver concentration of 2–10 mg/l.

To reduce the weight of replaceable units delivered by cargo spacecraft and to curtail the time of scheduled maintenance, the separation section of the separation unit may be connected to the condensate removal unit by means of a fluid disconnector.

To prevent the bed materials of the sorption purification unit from being fouled with microflora, the inlet of said unit may be additionally outfitted with a cocurrent chamber filled with a contact preservative in the form of granulated material based on silver sulfate.

To rule out the carry-over of sorbent particulates from the sorption purification unit into the potable water plumping,it is expedient that the outlet of said unit be additionally equipped with a particulate filter made of a hydrophilic silver-impregnated porous material with pores not larger than 50 microns.

It is preferable that disinfection and preservation of water produced in the system should be ensured by installing a cocurrent chamber at the outlet of the conditioning unit, said chamber containing a bed of metal-carbon catalyst based on a metal of the platinum group and a bed of silver impregnated activated carbon interposed with a bed of ionite, in which case the chamber walls should be made from a conducting material.

The method and system for waste recovery from the atmosphere condensate of a habitable pressurized module realized in accordance with the present invention have the following main advantages.

Catalytic oxidation of undissociating organic contaminants prior to separation of condensate and the use for oxidizing the oxygen of air of a gas-liquid mixture has made it possible to conduct oxidation at the ambient temperature of habitable pressurized module and to rule out additional power consumption.

The realization of the method according to the invention provides for disinfecting the condensate as it passes on from one unit to another actually within the entire production process.

Succesive oxidation of undissociating organic contaminants gas-liquid mixture filter, reaction vessel and separator provides for virtually complete transformation of undissociating contaminants into dissociating ones which permits filling the purification unit with the bed materials intended actually only for the dissociating contaminants and making said purification unit insensitive to variations in the content of undissociating organic compounds in the condensate.

The system according to the invention for decontamination and preservation of condensate and water utilizes the same technological solution in different units: an electrochemical element built into the unit consisting of two filled electrodes, viz., a metal-carbon catalyst containing one of metals of the platinum group, silver impregnation activated carbon and a conductor, either liquid (condensate in the unit) or solid (ionite, conducting materials of the structure).

The disinfection and preservation effect is attained due to contact with silver released by the electrochemical element and a weak electric field generated by the element. This results in uniform saturation of water with silver regardless of the degree of water mineralization.

Coating the pore surfaces of the hydrophylic barriers of the separation section with metallic silver and platinum increased the service life of the hydrophylic barriers thanks to eliminated fouling of barrier pores with microflora.

Installation of an additional chamber with contact preservative at the inlet of the soprtion purification unit reduced substantially the growth of microflora in the soprtion bed materials of the unit.

Installation of the silver impregnated particulate filter at the outlet of the sorption purification unit prevented the carry-over of particulates and microflora from the purification unit thus extending the service life of the system and improving the quality of product water.

Incorporation of the end-of-life sensor of the separation section into the separation unit ensured useful information on the functioning of the separation section while connection of the separation section to the condensate removal unit by a fluid disconnect provided the possibility of replacing the separation section alone instead of discarding the unit at the end of its life, thus ruling out the probability of depressurizing the liquid lines; this contributed to reducing the weight of the hardware delivered by the cargo spacecraft. Besides, this embodiment of the system contributed to reducing the effort of the crew engaged in component replacement.

Filling the entire liquid cavity of the separation unit with an aqueous solution of ionic silver in the course of ground preparation of the system made it possible to prevent reduction of service life of the separation unit in terms of separated liquid due to suppression of microflora growth in the pores of capillary-porous membranes within the time period from servicing to the start of functioning end, in addition and ensured, suppression of the growth of microflora in the other components of the system.

Filling the filter of gas-liquid mixture with ionite instead of polypropelene fibre allowed an increase of the system service life in terms of contaminants removed from condensate.

Combination of various technological processes in the units, viz.: oxidation of undissociating organic impurities into the dissociating ones. The removal of chemical contaminants and decontamination—in the filter of gas-liquid mixture and reaction vessel; separation of condensate from the gas-liquid mixture, oxidation of undissociating organic compounds, condensate decontamination—in the condensate separation unit; disinfection of condensate, the removal of organic and inorganic compounds—in the sorption purification unit; mineralization, decontamination and preservation of water—in the conditioning unit, all ensured the high quality of the product water and simultaneously the reduced specific weight of the system.

BRIEF DESCRIPTION OF THE DRAWINGS

Now the invention will be elucidated by a description of particular but not confining embodiments of the invention with reference to the appended drawings wherein, according to the invention:

FIG. 2 is a schematic view of the filter of gas-liquid mixture, sectionalized;

FIG. 3 is a schematic view of the catalytic oxidation reaction vessel, sectionalized;

FIG. 4 is a schematic view of the separation section, sectionalized;

DESCRIPTION OF PREFERABLE EMBODIMENTS OF THE INVENTION

The method according to the invention for producing water from the atmosphere of a habitable pressurized module containing the water vapors released by the inhabitants of said pressurized module will be understood from the following description of the water-producing system.

Figure 1:
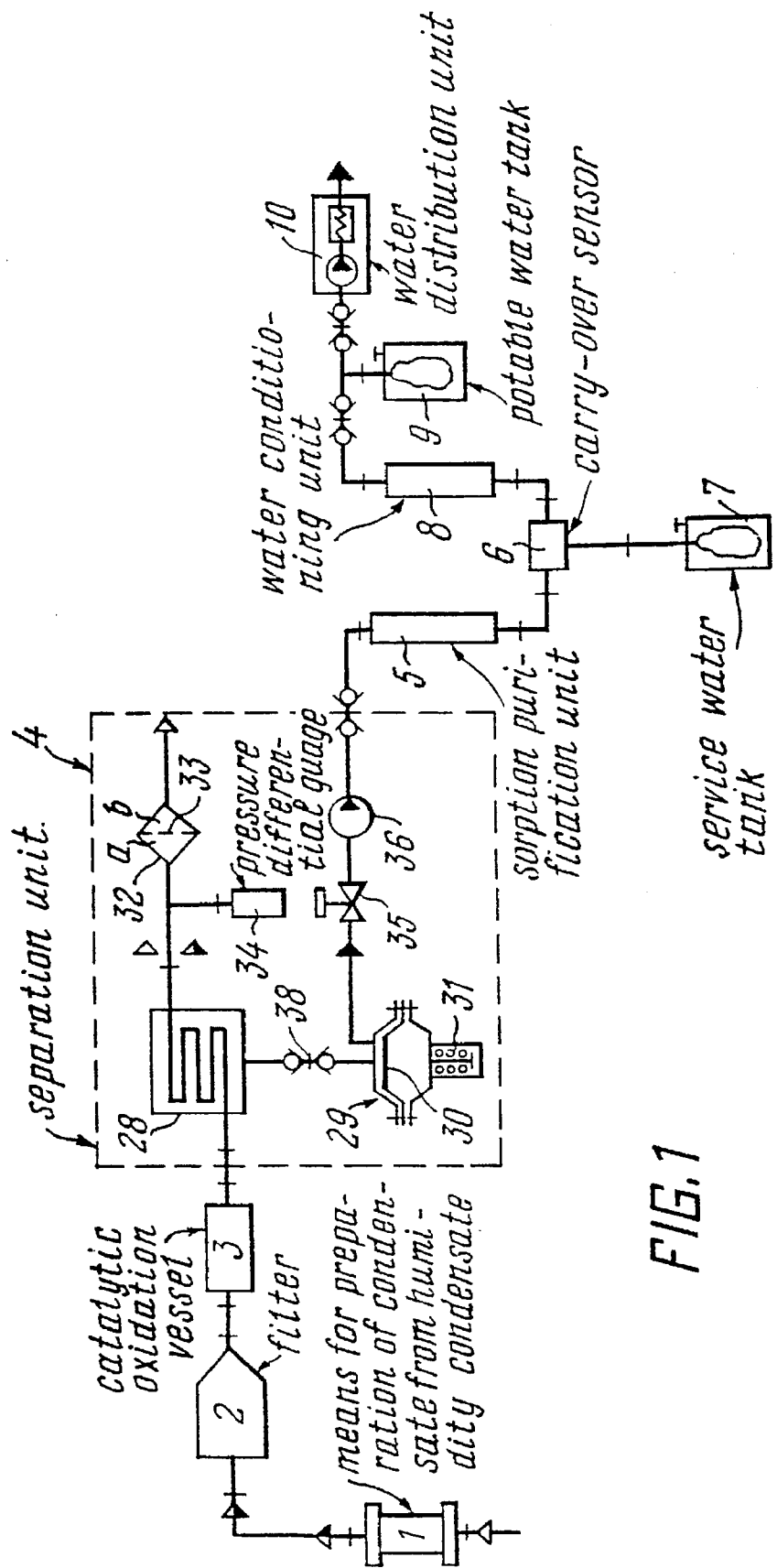
FIG. 1 illustrates the system for producing water from the atmosphere of a habitable pressurized module.

The system for producing water from the atmosphere, according to the invention, shown in FIG. 1, comprises successively-arranged means 1 for preparation of condensate from humidity condensate, filter 2 of gas-liquid mixture, catalytic oxidation vessel 3, separation unit 4, condensate sorption purification unit 5, contaminant carry-over sensor 6, service water tank 7, water conditioning unit 8, potable water tank 9, and water distribution unit 10.

The filter 2 (FIGS. 1, 2) of gas-liquid mixture comprises a cylindrical casing 11 having an inlet pipe fitting union 12 and an outlet fitting 13, a central perforated pipe 14 connected at one end to the inlet fitting 12 and closed at the other end, perforated cylinders 15, 16, 17 arranged in casing 11 concentrically around the central pipe 14 in a spaced relation to said pipe, to one another and to the cylindrical wall of the casing 11, and having a bottom 18 at the closed end of the central pipe 14, the cylinders 15–17, pipe 14 and casing 11 being made from a conducting silver-clad material. The central pipe 14 and cylinders 15, 16, 17, form annular chambers, the circular gap between the cylinder 17 and the wall of the casing 11 communicating with the outlet pipe union 13. The packing of the first annular chamber counting from the axis of the casing 11 consists of silvered activated carbon 19, that of the second chamber, of metal-carbon catalyst 20 containing at least one metal of the platinum group, e.g. platinum or iridium, preferably platinum, and that of the third chamber, of granulated or fibrous ionite 21 with filtering fabric 22 disposed at the wall of larger diameter.

The reaction vessel 3 (FIGS. 1, 3) for catalytic oxidation is a cocurrent chamber 23 with an inlet fitting 24 and an outlet fitting 25. The chamber 23 contains a filler 26 of metal-carbon catalyst containing at least one metal of the platinum group and silvered activated carbon in a relation of 50–90- 50–10 vol.-%, respectively. A filter 27 of particulates is installed downstream of the filler 26 in the chamber 23.

The condensate separation unit 4 (FIGS. 1,4) comprises a separation section 28, a condensate removal unit 29 with a flexible membrane 30 and a flexible member 31 (spring), an end-of-life sensor of the separation section 28, made in the form of a chamber 32 divided by a capillary-porous hydrophobic partition 33 into two cavities a and b of which cavity a communicates with gasphase outlet of the separating section 28 and with the pressure differential gauge 34 (for example of a membrane type) while cavity b is in communication with the atmosphere of the pressurized module. The separating unit 4 also comprises a solenoid valve 35 and a pump 36 both connected to the unit 29.

Figure 5:
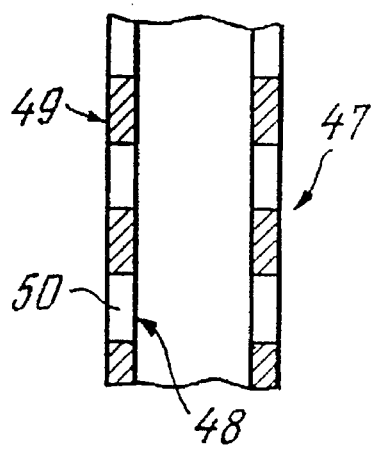
FIG. 5 is a schematic view of fragment A in FIG. 4, enlarged.

The separation section 28 has a bunch of tubes enclosed into a housing 37 provided with a fluid disconnect 38 for the removal of the separated condensate, and into tube plates 39, 40. The stack of tubes is additionally closed at one end with a cover 41 provided inside with partitions 42 and having a fitting 43 for feeding the gas-liquid mixture into the tubes, and a fitting 44 for venting separated gas, and has a similar cover 45 with partitions 46 at the other end. The provision of the partitions 42, 46 in the covers 41, 45, respectively, enables the flow to move in succession through all the members 47 of the stack of tubes (FIGS. 4, 5).

The bunch of tubes is formed by a plurality of parallel hydrophylic capillary-porous tubular members 47 with an inside diameter not over 10 mm and the equivalent diameter of pores not over 30 microns. The external and internal surfaces 48, 49 of the tubular members 47 and the walls of the pores 50 are coated partly with metallic platinum and partly with metallic silver.

Figure 6:
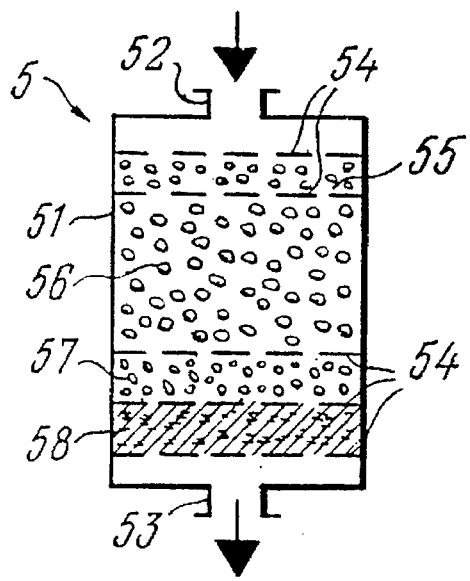
FIG. 6 is a schematic view of the condensate sorption purification unit, sectionalized.

The condensate sorption purification unit 5 (FIGS. 1, 6) is a column 51 provided with an inlet fitting 52 and an outlet fitting 53 and has cocurrent chambers arranged successively from the inlet fitting 52 to the outlet one, said chambers being separated from one another by grates 54 and filled successively along the flow with preservative 55 in the form of a granular material based on silver sulfate, ionite 56, and activated carbon 57. The last chamber along the flow accommodates particulate impurity filter 58 made of hydrophylic silver-impregnated porous material with a pore size not over 50 microns.

Figure 7:
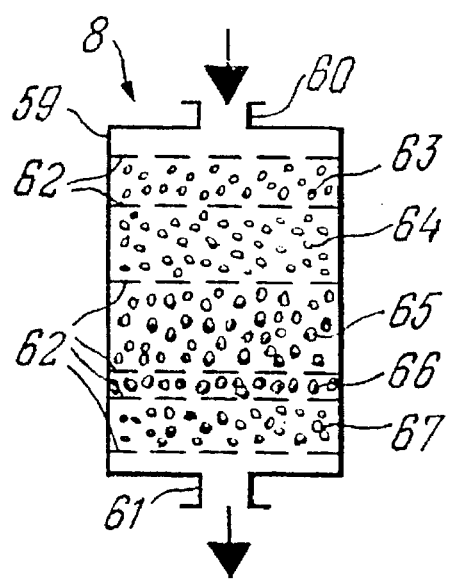
FIG. 7 is a schematic view of the water conditioning unit, sectionalized.

The conditioning unit 8 (FIGS. 1, 7) has the form of a column 59 with an inlet fitting 60 and an outlet fitting 61. The unit 8 has cocurrent chambers divided by grates 62 and positioned successively from the inlet fitting 60 to the outlet one and filled with preservative 63 in the form of granulated material based on silver sulfate, mineralizer 64, metal-carbon catalyst 65 based on at least one metal of the platinum group, ionite 66 and silvered activated carbon 67. The walls of the column 59 are made from a conducting material.

The condensate-producing means 1, the tanks 7, 9, the liquid distribution unit 10 and the contaminant carry-over sensor 6 may be made from any suitable units widely known in the art. For this reason the above-listed units are not illustrated in detail in the drawings. In particular, the condensate-producing means 1 may comprise, for example, a fan, a heat exchanger (condenser), a pump, pipe fittings and a control unit. The fan feeds the air of the pressurized module into the heat exchanger where the vapors contained in said air are condensed. Condensate together with air is removed from the heat exchanger by the condensate suction pump and sent for water recovery.

Each tank (7, 9) is a flexible vessel made, for example, of a polymeric material and enclosed in a protective housing made of a stiff polymer or metal. The flexible vessel has a throat fitted into the casing cover for both filling and emptying the liquid. Said cover also has a fitting communicating with the atmosphere of the pressurized module which enables maintaining the pressure in the space between the flexible vessel and the casing equal to the pressure in the pressurized module both during filling and emptying of the flexible tank.

The distribution unit 10 may have the form of a pump, heater, recuperative air heater, shut-off fittings and a control unit, all mounted on a single frame. The distribution unit 10 is capable of dispensing water either by operator-set portions or in a continuous flow. It can produce hot and warm pasteurized and cold nonpasteurized water. Pasteurization of water is conducted by treating it in a heater whose liquid channel is so constructed as to prevent mixing of pasteurized and nonpasteurized water. The recuperative air heater used in the unit permits utilizing a part of heat of pasteurized water for its preliminary heating.

The contaminant carry-over sensor 6 may have the form, for example, of an electric cell whose operating principle is based on continuous measurement of electric conductivity of the liquid flowing between two energized electrodes and on sending a signal when said electric conductivity exceeds the preset value. A too high conductivity is an evidence that the degree of liquid purification fails to meet the specified requirements.

The system for water recovery from the atmosphere of a habitable pressurized module functions as follows.

The system in the initial state is filled with bed materials and an aqueous solution of ionic silver.

Filling the entire volume of the liquid cavity in the separation section 28 of the separation unit 4 with an aqueous solution of ionic silver while the system is being readied on the ground makes it possible to rule out the reduction of service life of the separation unit 4 in terms of separated liquid thanks to suppressed growth of microflora in the pores of the capillary-porous tubular members 47 of the unit within the time from the filling of the system to the start of operation and, in addition, suppresses the growth of microflora in the other units of the system.

The gas-liquid mixture produced from the vapor-condensing means 1 and from the means for producing humidity condensate in the pressurized module flows into the filter 2 (FIGS. 1, 2) of gas-liquid mixture through the fitting 12, passing successively through its three annular chambers. On its way the particulates are removed from the mixture, the microflora is suppressed by the electric field of the electrochemical element formed by a metal-carbon catalyst containing at least one metal of the platinum group, silvered activated carbon, and due to the contact of condensate with silver released by the electrochemical element and silvered elements of the filter. The undissociating organic contaminants of condensate are also oxidized using the metal-carbon catalyst and transformed into the dissociating ones by the use of oxygen of transport air. The dissociating and undissociating organic and inorganic compounds are sorbed in using ionites.

The gas-liquid mixture flows from the filter 2 into the catalytic oxidation reaction vessel 3 (FIGS. 1, 3) where all the undissociating contaminants of condensate are oxidized using the metal-carbon catalyst into the dissociating ones with the oxygen of transport air, and microflora is suppressed by the electric field of the electrochemical element and by contact with the silver released by the electrochemical element, just like it occurs in the filter 2.

The mixture leaving the reaction vessel 3 is fed the separation unit 4. While the mixture passes through the tube space of the separation section 28 of the unit 4 (FIGS. 1, 4) condensate due to a vacuum built up in the intertubular space by the flexible membrane 30 with the flexible member (spring) 31 and the hydraulic resistance across the channel said condensate is sucked out of the flow through liquid-permeable porous walls of the members 47 (whose walls are coated partly with platinum and partly with silver) into the intertubular space (meanwhile the membrane going down) while air is vented through the chamber 32 of the end of life sensor into the working compartment of the pressurized module.

The process of separation is accompanied by additional catalytic oxidation of undissociating organic using platinum contaminants, and by electrochemical decontamination of condensate due to the effect of the electric field generated by the electrochemical platinum-silver element, and of the silver ions released by said electrochemical element.

After the separation section 28 has reached the end of its service life, the gas-liquid mixture is no longer separated and enters the chamber 32 of the end-of-life sensor. The capillary-porous hydrophobic partition 33 of the chamber 32 becomes covered with a layer of condensate and prevents the escape of air from the chamber 32. As a result, the pressure builds up in the sensor chamber 32 and the pressure differential gauge 34 sends appropriate information. In this case, the separation section 28 must be disconnected by means of the fluid disconnect 38 from the condensate removal unit 29, and replaced. The fluid disconnect 38 will rule out escape of water from the separation section 28 being replaced and penetration of air into the condensate removal unit 29.

Condensate is forced by the pump 36 from the unit 4 (FIGS. 1, 6) into the sorption purification unit 5 where the contact preservative 55 based on silver sulfate ensures decontamination of the condensate at the inlet of the unit 5, then contaminants are sorbed using ionites 56 and activated carbon 57 while the liquid at the outlet of the unit 5 is purified in the built-in filter 58 made of hydrophilic silver-impregnated material with a pore size not over 50 microns from possible particulates (particles of carbon, ionite). Impregnation of the material with silver prevents its fouling with microflora and reduces the probability of penetrating of said microflora into the conditioning unit 8 located downstream of the process.

The purified condensate then enters the conditioning unit 8 (FIGS. 1, 7) where it flows successively through the chambers with preservative 63, mineralizer 64, metal-carbon catalyst 65 containing a metal of the platinum group, ionite 66 and silver impregnated activated carbon 67. The catalyst 65, ionite 66 and silver impregnated activated carbon 67 form an electrochemical element wherein the catalyst 65 and silver impregnated carbon 67 function as filled electrodes while ionite 66, as solid electrolyte. Being acted upon by a weak electrical field of the electrochemical element and by the silver released by said element, the mineralized water is decontaminated and preserved.

The electrochemical element allows saturation of the solution uniformly with silver throughout the service life of the conditioning unit 8, the concentration of silver being independent of the pumping rate and degree of water mineralization.

Then water is passed on from the conditioning unit 8 into the potable water tank 9 (FIG. 1) and thence, into the distribution unit 10. Here, water is pasteurized and dispensed to the crew either by portions or in a continuous flow. The liquid channel of the heater of the unit 10 is designed so that mixing of the pasteurized with nonpasteurized water is ruled out. Besides, the heat recuperator incorporated in the unit allows part of heat of pasteurized water to be used for its preliminary heating.

In case of unsatisfactory purification of condensate, water is dumped into the service water tank 7 with a command sent from the contaminant carry-over sensor 6.

A pilot system for water recovery according to the present invention was built and tested. Comparative data on the service life of the system components according to the invention and of those of the prototype that had been functioning on the orbital station "Salyut-6" are summarized in the Table below, the dimensions and weight of the units in both systems being the same.

| No. | Name of unit | Service life, 1 Prototype | Claimed system | Remarks |
|---|---|---|---|---|
| 1 | 2 | 3 | 4 | 5 |
| 1. | Filter of gas-liquid mixture | 300 | 900 | |
| 2. | Reaction vessel for catalytic oxidation | — | 1200 | |
| 3. | Separation section of separation unit | 150 | 400 | |
| 4. | Sorption purification unit | 200 | 1200 | |
| 5. | Conditioning unit | 300 | 900 | |

It was possible to reduce the specific weight of the system (weight of equipment related to that of the recovered water) from 0.4 kg/kg to 0.15 kg/kg.

We claim:

1. A method for water recovery from the atmosphere of a habitable pressurized module laden with water vapors released by the inhabitants comprising the following operations:

condensing said vapors to produce a gas-liquid mixture which contains atmospheric air and condensate;

filtering said gas-liquid mixture to separate solid particles therefrom;

catalytic oxidizing undissociating organic compounds contained in said gas-liquid mixture at the ambient temperature and pressure to transform them to dissociating organic compounds by contacting said gas-liquid mixture with a catalyst bed comprising metal-carbon catalyst, containing at least one metal of the platinum group, to which silver impregnated activated carbon is added, to obtain an oxidized mixture;

separating condensate from the oxidized mixture by passing said oxidized mixture through a static separator including a hydrophilic capillary-porous barrier having a plurality of pores therethrough;

sorption purifying said condensate by passing it through activated carbon and ion exchangers to obtain a purified condensate; and disinfecting, mineralizing and preserving the purified condensate to a desired grade.

2. The method of claim 1 wherein said catalyst bed contains 10% to 50% by volume of the silver impregnated activated carbon.

3. The method of claim 1 wherein at least a portion of the oxygen of said air in said gas-liquid mixture is employed as an oxidant in said catalytic oxidation.

4. The method of claim 1 wherein the surface of said hydrophilic capillary-porous barrier and the surface of said plurality of pores are at least partially coated with metallic platinum and at least partially coated with metallic silver to form a plurality of electrochemical cells having electrodes and an electrolyte, the electrodes being the metallic platinum coating and the metallic silver coating and the electrolyte being said condensate.

5. The method of claim 4 wherein said separation of said condensate includes electrochemical disinfection and preservation of said condensate by contact with an electrical field generated by the plurality of electrochemical cells.

6. The method of claim 5 wherein said condensate is disinfected by contact with silver ions.

7. The method of claim 1 wherein said preservation comprises passing said purified condensate through a supplemental catalyst bed comprising metal-carbon catalyst containing at least one metal of the platinum group, a bed of ion exchanger and a bed of silver impregnated activated carbon.

* * * * *

UNITED STATES PATENT AND TRADEMARK OFFICE
CERTIFICATE OF CORRECTION

PATENT NO. : 5,643,457
DATED : July 1, 1997
INVENTOR(S) : Abramov et al.

It is certified that error appears in the above-indentified patent and that said Letters Patent is hereby corrected as shown below:

On title page, item
   [73] Assignee: read  --Aktsionernoe Obschestvo Otkrytogo Tipa    Nauchnoissledovatelsky I Konstruktorsky Institut Khimicheskogo Mashinostroenia Niikhimmash , Russian Federation--

Signed and Sealed this

Third Day of March, 1998

*Attest:*

BRUCE LEHMAN

*Attesting Officer*    Commissioner of Patents and Trademarks